Feb. 21, 1967   JAMES E. WEBB   3,305,861
ADMINISTRATOR OF THE NATIONAL AERONAUTICS
AND SPACE ADMINISTRATION
CLOSED LOOP RANGING SYSTEM

Filed Feb. 11, 1965   3 Sheets-Sheet 1

INVENTOR
ROBERT C. BUNCE
BY
ATTORNEY

Feb. 21, 1967  JAMES E. WEBB  3,305,861
ADMINISTRATOR OF THE NATIONAL AERONAUTICS
AND SPACE ADMINISTRATION
CLOSED LOOP RANGING SYSTEM
Filed Feb. 11, 1965  3 Sheets-Sheet 2

INVENTOR
ROBERT C. BUNCE
BY
ATTORNEY

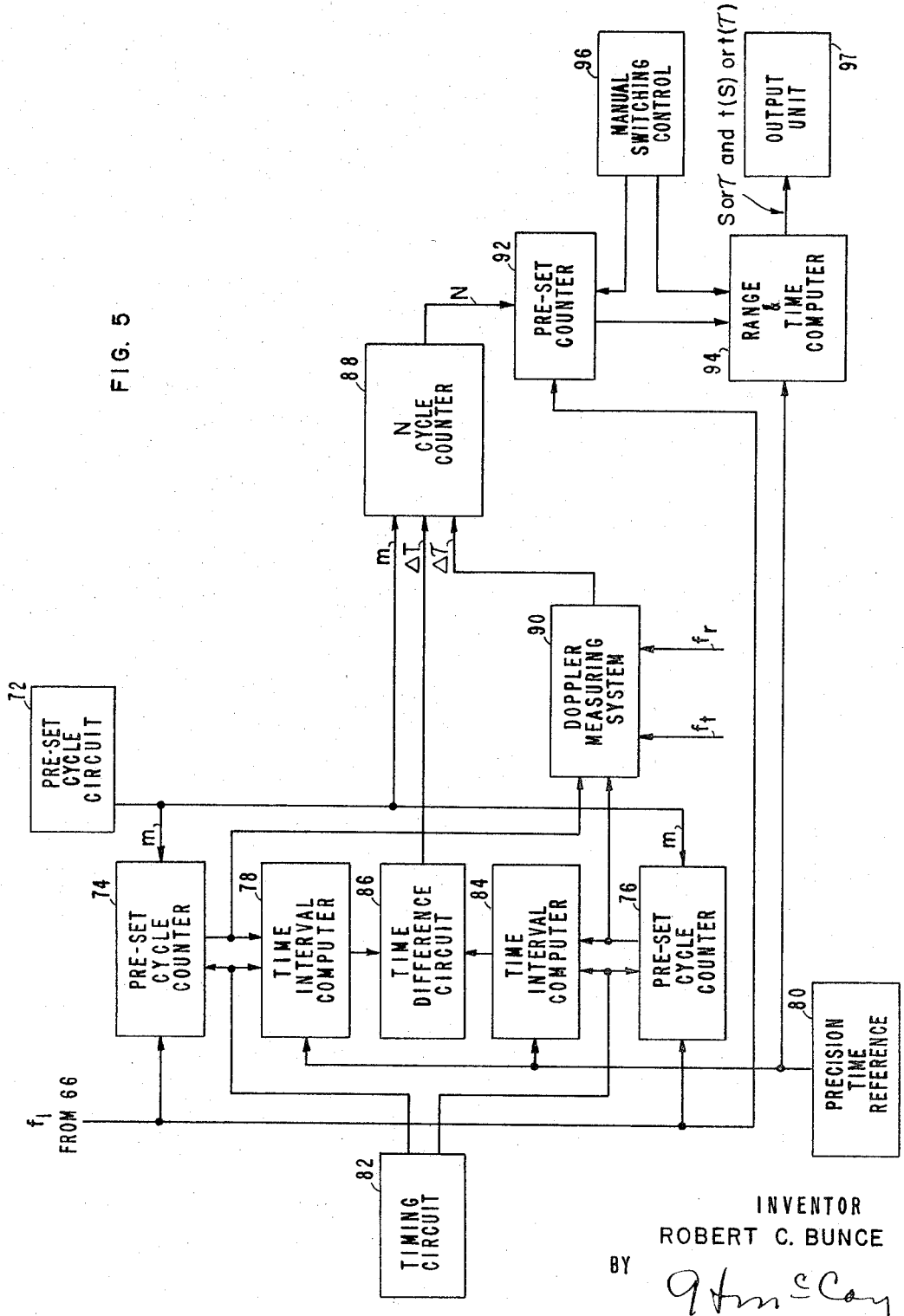

3,305,861
CLOSED LOOP RANGING SYSTEM
James E. Webb, Administrator of the National Aeronautics and Space Administration, with respect to an invention of Robert C. Bunce, La Crescenta, Calif.
Filed Feb. 11, 1965, Ser. No. 432,027
13 Claims. (Cl. 343—12)

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to a ranging system and, more particularly, to a closed loop radio signal communication ranging system.

Various systems have been developed to determine the distance or range between a moving vehicle, such as a missile in space, and a fixed ground station. In general, complex digital pulsing and/or signal correlation techniques are employed to compare signals received from the moving vehicle with signals transmitted thereto, in order to determine the distance on the basis of the total travel time of such signals from the ground station to the vehicle and back.

Generally, prior art systems are quite complex, generating and analyzing substantial amounts of signal data in order to derive the desired information, namely, the range of the vehicle from the ground. In addition, new signals need be generated for every measurement of the range of the moving vehicle with respect to the ground station. For example, once the range is determined by a conventional ranging system, Doppler measurements are made to continuously update the range as the vehicle moves with respect to the ground station.

Accordingly, an object of the invention is to provide a ranging system wherein a closed loop radio transmitting and receiving arrangement is used to conveniently provide range information of a moving space vehicle at any time during its travel, without the need to generate new signals for each range measurement, and by the use of an unmodulated radio carrier signal.

Another object of the invention is to provide a closed loop radio communication system whereby ranging information is conveniently derived.

Another object of the invention is the provision of a novel ranging system wherein dual carrier radio communication techniques are employed to determine the range of a moving vehicle from a fixed station.

A further object of the invention is the provision of a ranging system wherein a controlled closed loop transmitting and receiving system is used to circulate, in a closed loop communications path, signals at a fixed number of cycles, which are used to determine the range of a moving vehicle in space at any point in its travel path.

These and other objects of the invention are achieved in a system wherein a dual carrier radio frequency (RF) ground-to-missile communication system is employed. One of the carriers, hereinafter referred to as the ranging carrier, is operated in a closed loop configuration. Namely, the instantaneous received frequency by either the ground station or the vehicle in space controls the frequency of the instantaneously transmitted signal. By so maintaining two communication locations, the absolute phase-difference between the receiving and transmitting terminals at each location is a constant, regardless of the absolute frequency of the ranging carrier at any time. Thus, for each cycle received at either location (ground station or vehicle) a cycle is simultaneously transmitted. By such a communication technique, no additional cycles are either added to, or subtracted from, the total number of cycles in the loop which is closed upon itself. Consequently, the total phase around the closed loop is at all times a constant, and an integral number of cycles regardless of the time-distance profile existing between the two locations.

The second carrier used in the present invention is maintained in a standard open-loop condition, so that conventional Doppler measurements may be made thereon to produce a time-velocity profile of the vehicle with respect to the ground station. By performing measurements on both the closed-loop and open-loop carriers, as will hereinafter be described in detail, the exact number of circulating cycles in the closed-loop carrier can be calculated. Once this number is determined, the period required for the cycles to pass through the ground station is measured, thereby yielding the total round-trip travel time.

Knowing the time or phase delays introduced by the closed-loop transmitting and receiving systems in both the ground station and the moving vehicle, the round-trip propagation time of the circulating cycles, as well as, the distance between the two locations associated with such round-trip time, can be conveniently calculated.

Since the number of RF cycles in the closed loop is a constant, but the distance between the ground station and the vehicle varies, the total travel time, namely the time required for any given cycle in the loop to travel to the vehicle and back, varies. Consequently, the frequency of the carrier comprising the closed loop changes, decreasing as the travel time increases, and increasing as the travel time decreases. Appropriate measurements made on this carrier yield a time-frequency profile of the closed-loop signal, from which the range of the vehicle from the ground at any time during its travel can be determined. It should be noted, that the Doppler measurements made on the open-loop carrier are not performed to update the range, as is the case in prior art systems. Rather, such measurements are performed to derive the fixed number of cycles, which once known, are used for subsequent range measurement without the need for subsequent Doppler measurements.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 5 is a block diagram of one embodiment of the present invention.

As previously stated, the present invention is based on measurements performed on a fixed number of cycles circulating in a closed-loop communication arrangement in order to determine the range between a moving vehicle and a ground station. In the following description, a mathematical analysis of the time and signal frequency relationships will first be disclosed in order to develop a relationship from which the fixed number of cycles may be derived. Thereafter, one embodiment for practically deriving the fixed number of cycles as well as the desired range information will be shown and described.

Figure 1:
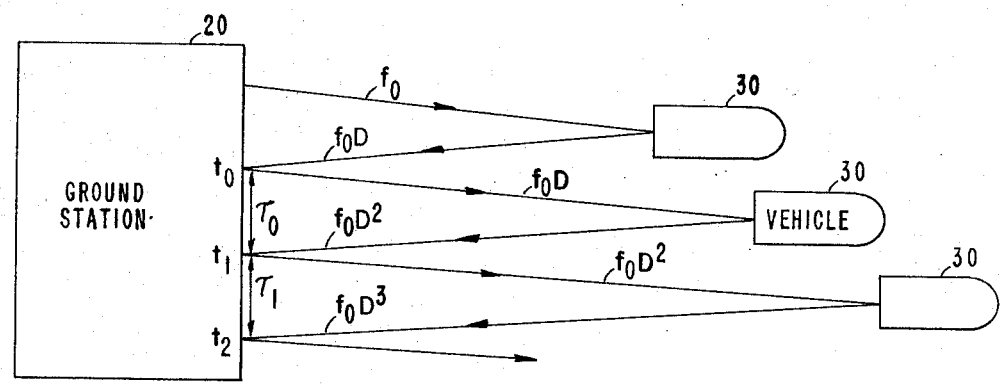
FIGURE 1 is a diagram useful in explaining the operation of the closed-loop ranging carrier.

Reference is now made to FIGURE 1 which is a simplified diagram useful in explaining the time-frequency relationship in a closed loop radio communication system. In FIGURE 1, distance from the ground is plotted to the right and increase in time is diagrammed downwardly. Let us assume that both a ground station 20 and a moving vehicle 30 include transmitting and receiving systems hereinafter referred to as communication systems. Let us further assume that the ground station prior to time $t_0$ transmits radio signals at a frequency $f_0$ with the moving vehicle retransmitting the signals received therein. Then, because of the Doppler effect, it is seen that the frequency of the received signal will be $f_0 \times D$ where D equals $$\frac{C-V}{C+V}$$

known as the Doppler multiplier. C represents the propagation velocity of radio signals and V represents an assumed constant velocity of the vehicle 30 moving away from the ground station 20.

This state will exist so long as the ground station transmits signals of a frequency $f_0$ and receives signals of a frequency $f_0 \times D$. Let it further be assumed that at time $t_0$, the communication systems in the vehicle 30 and ground station 20 are interlocked in a closed loop. Namely, in each of the systems which are assumed to introduce substantially zero phase delays, the instantaneous transmitted frequency is always controlled by, and equal to, the instantaneous received frequency. Then, in light of the foregoing, it is seen that at time $t_0$, the transmitted frequency at the ground station changes from $f_0$ to $f_0 \times D$ which is the instantaneous received frequency. Theoretically, this frequency is maintained until a time $t_1$, when the frequency shift occurring at $t_0$, namely $f_0 \times D$ is returned, again to the ground station 20, modified by the Doppler multiplier D. Thus, the instantaneous received frequency at $t_1$ is $f_0 \times D^2$. This frequency institutes a new shift in the transmitted frequency from the ground station so that theoretically from time $t_1$, the transmitted frequency will be $f_0 \times D^2$, until time $t_2$ when this transmitted frequency will be received, modified once more by the Doppler multiplier D so as to equal $f_0 \times D^3$. This closed loop communication arrangement continues, with each received signal producing a shift in the transmitted frequency from the ground station.

Figure 2:
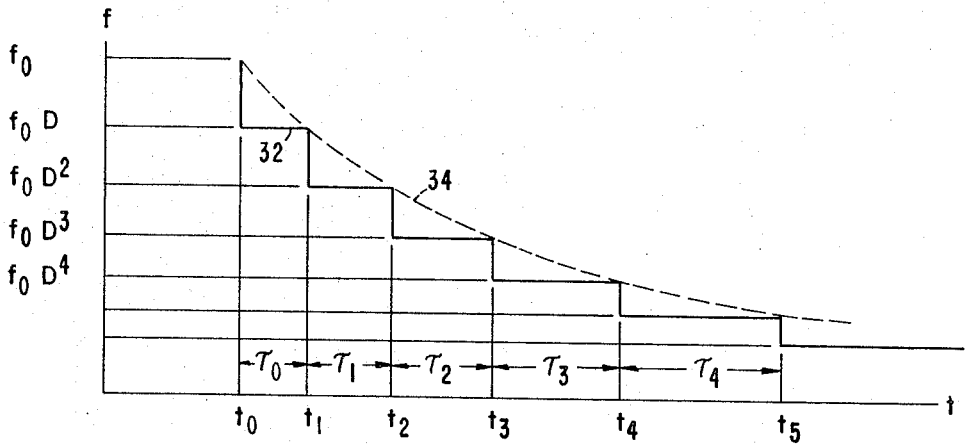
FIGURE 2 is a time frequency chart useful in explaining the principles of the invention.

Reference is now made to FIGURE 2 which is a time-frequency diagram of the transmitted frequency at the ground station 20, the horizontal axis representing time ($t$) and the vertical axis representing frequency ($f$). The multistep line designated by numeral 32 represents the hypothetical time-frequency step profile which is based on the assumption that the response time of the communication system of the ground station 20 in changing the transmitting frequency thereof to be equal to the received frequency, is zero, namely the frequency shift is instantaneous.

It is apparent, however, that any transfer device controlling the transmitted frequency to equal the received frequency has a finite, rather than zero, response time. Thus, multistep line 32 corresponds to a hypothetical step function. But when using known closed-loop transfer devices, such as a phase-lock loop, after transient conditions subside, it is possible to approximate with a constant small phase difference, the condition under which an instantaneous received frequency controls and equals the instantaneous output transmitted frequency. The time-frequency profile of such a system assumes a smooth, or analog, characteristic.

Furthermore, in the steady state condition, the received frequency is constantly changing as a function of the vehicle motion, the received frequency constantly decreasing when the vehicle moves away from the ground. Thus, the theoretical steady state condition may be represented by the dashed line 34 in the time-frequency profile shown in FIGURE 2. It should be noted that the theoretical steady state solution corresponds to the hypothetical step function (line 32) at the conclusion of each round trip, with the phase development during each round trip being a constant.

As seen from FIGURE 2, the successive round trip periods between $t_0$ and $t_1$, $t_1$ and $t_2$, $t_2$ and $t_3$, etc. are respectively designated $\tau_0$, $\tau_1$, $\tau_2$, etc. Under constant velocity conditions, it can be shown that $$\frac{\tau_1}{\tau_0}=\frac{\tau_2}{\tau_1}=\frac{\tau_3}{\tau_2}=\frac{C+V}{C-V}=R \quad (1)$$

Figure 3:
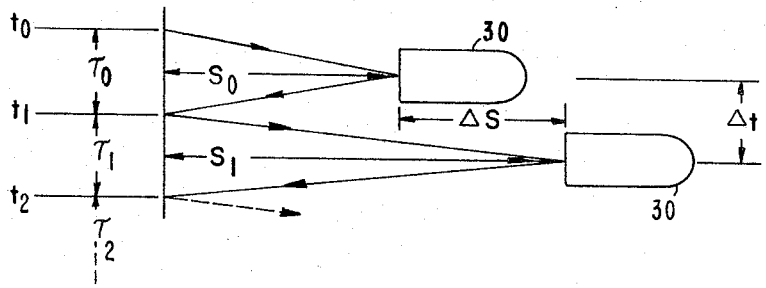
FIGURE 3 is another diagram useful in explaining the principles underlying the present invention.

The derivation of the foregoing relationship may best be explained in conjunction with FIGURE 3 to which reference is made herein. Let us assume that at a given instant, the distance between the ground and the vehicle 30 is $S_0$ so that a signal transmitted at $t_0$ reaches the moving vehicle at $S_0$ and is reflected back, traversing the round trip in a time period $\tau_0$. Then, $$S_0=\frac{C\tau_0}{2} \quad (2)$$

Similarly, $$S_1=\frac{C\tau_1}{2} \quad (3)$$

where $S_1$ is the distance of the vehicle at a later instant in time, and $\tau_1$ is a time period required for a signal released at time $t_1$ to traverse the round trip.

The distance difference between $S_1$ and $S_0$ is:

$$\Delta S = S_1 - S_0 = V\Delta t = V\left[\frac{\tau_0}{2}+\frac{\tau_1}{2}\right] \quad (4)$$

$\Delta t$ represents the difference in time when the vehicle 30 was at distances $S_0$ and $S_1$. V represents the velocity of the vehicle which is assumed to be constant. Thus, $$V\left[\frac{\tau_0}{2}+\frac{\tau_1}{2}\right]=\frac{C\tau_1}{2}-\frac{C\tau_0}{2} \quad (5)$$

solving for $\tau_1/\tau_2$ the above equation is reduced to $$\frac{\tau_1}{\tau_0}=\frac{C+V}{C-V}=R \quad (6)$$

Similarly, it can be shown that $$\frac{\tau_2}{\tau_1}=R, \qquad \frac{\tau_3}{\tau_2}=R$$

or in general, $$\frac{\tau_n}{\tau_{n-1}}=R \quad (7)$$

Assuming that $t_1$ represents the time at the end of the first round trip started at $t_0$ which is zero time, then $$t_1=\tau_0 \quad (8)$$

and $$t_2=\tau_0+\tau_1 \text{ etc.} \quad (9)$$

Therefore, the elapsed time at any discrete point $t_n$ is thus:

$$t_n=\tau_0+\tau_1+\tau_2 \ldots +\tau_{n-1} \quad (10)$$

The term $t_n$ may be defined in terms of $\tau_0$ only, $$t_n=\tau_0+R\tau_0+R^2\tau_0 \ldots R^{n-1}\tau_0 \quad (11)$$

or $$t_n=\tau_0[1+R+R^2 \ldots +R^{n-1}] \quad (12)$$

Since as hereinbefore defined, the communication systems of both the ground station and the vehicle are interlocked in a closed loop, namely a cycle is transmitted only for each cycle received, the total phase around the loop is an integral number of cycles, and is a constant, hereinafter designated as N. Thus, the phase $\phi_n$ at time $t_n$, namely after N cycles pass through $n$ round trips, is $nN$, or, $$n=\frac{\phi n}{N} \quad (13)$$

Substituting Equation 13 in the series 11 and multiplying $\tau_0$ by $$\frac{R-1}{R-1}$$

the series may be reduced and simplified to $$tn = \tau_0 \frac{R^{\frac{\phi_n}{N}}-1}{R-1} \quad (14)$$

Equation 14 represents a discrete point or function of the curve shown by the solid line 32 of FIGURE 2. If, as it is reasonable to assume, the function assumes, in steady state, a smooth analog condition, then Equation 14 may be generalized to $$t = \tau_0 \frac{R^{\frac{\phi}{N}}-1}{R-1} \quad (15)$$

or the phase at any time is $$\phi = \frac{N}{\log_e R} \log \left[ \left( \frac{R-1}{\tau_0} \right) t + 1 \right] \quad (16)$$

The phase rate designated $\dot{\phi}$, which is the instantaneous frequency $f(t)$, is $$\dot{\phi} = f(t) = \frac{N}{\log_e R} \left[ t + \frac{\tau_0}{R-1} \right]^{-1} \quad (17)$$

and the rate of change of frequnecy designated $\dot{f}(t)$ equals $$\dot{f}(t) = \frac{N}{\log_e R} \left[ t + \frac{\tau_0}{R-1} \right]^{-2} \quad (18)$$

Solving Equations 17 and 18 for N, $$N = -\log_e R \frac{f^2}{\dot{f}} \quad (19)$$

From the foregoing mathematical analysis, it is seen that N, namely, the number of fixed cycles in the closed loop system is expressed in terms of R which, as previously defined, is a function of the velocity V of the vehicle. The expression for N may further be simplified to show the independence of N from the velocity, so long as the velocity is much smaller than the propagation velocity C.

From Equations 17 and 18, when $t = \tau_0$, $$\frac{f}{\dot{f}} = -\left[ \tau_0 + \frac{\tau_0}{R-1} \right] \quad (20)$$

Substituting $$\frac{V+C}{V-C}$$

for R and solving for $\tau_0$ $$\tau_0 = \frac{2V}{C+V} \times \frac{f}{\dot{f}} \quad (21)$$

The round trip period $\tau_0$ may be used to define $\tau_{(t)}$ where $t$ is the time of completion of the first round trip made by N cycles which passed through the ground station. As such $$\tau_{(t)} = \tau_0 + \frac{V}{C} \tau_0 \quad (22)$$

The term $V/C\tau_0$ represents the increase in round trip propagation time during the return trip.

Substituting Equation 21, Equation 22, is reduced to $$\tau_{(t)} = \frac{2V}{C} \times \frac{f}{\dot{f}} \quad (23)$$

However, since range S equals $C\tau/2$, the rate of change of distance which is the velocity V, equals $C/2$ times the rate of change of the instantaneous propagation, and can be designated $\dot{\tau}$.

Expressed in the form of an equation $$V = \frac{C\dot{\tau}}{2} \text{ or } \frac{2V}{C} = \dot{\tau} \quad (24)$$

Inserting Equation 24 in Equation 23 and multiplying each side by $\dot{f}$, $$\dot{f}\tau_{(t)} = -\dot{\tau} \frac{f^2}{\dot{f}} \quad (25)$$

Or, in light of Equation 19, $$\dot{f}\tau_{(t)} = \frac{\dot{\tau}N}{\log_e R} = \frac{\dot{\tau}N}{2\left[\frac{V}{C} + \frac{1}{3}\left(\frac{V}{C}\right)^3 + \cdots \right]} \quad (26)$$

Assuming that V is much smaller than C, all terms in the denominator except for the first term $(V/C)$ may be thought of as being equal to zero.

Thus, $$\dot{f}\tau \approx \frac{\dot{\tau}N}{\frac{2V}{C}} \quad (27)$$

which in light of Equation 24 may be reduced to $$\dot{f}\tau \approx \frac{\dot{\tau}N}{\dot{\tau}} = N \quad (28)$$

Equation 28 is independent of $\dot{\tau}$, a function of the velocity. Thus, the expression $N = f\tau$ is independent of the velocity of the vehicle so long as the velocity is small with respect to the propagation velocity C. Furthermore, it is seen that the product of the instantaneous frequency and propagation time at any instant during the travel of the vehicle is always equal to the fixed number of cycles within the closed loop.

By determining N, it is possible to measure the time required for that number of cycles to pass through the ground station, thereby determining $\tau$. Once $\tau$ is known, the range S is easily derived since $$S_{(t)} = \frac{C\tau_{(t)}}{2} \quad (29)$$

The number of cycles N is determined on the basis of preliminary estimate measurements, using the equation $N = f\tau$ as the basis of such calculations. For example, in one system for determining N, two measurements of $f$ are made at different times, and the change in the propagation time $\Delta\tau$ between them is determined. The two frequencies are determined by measuring the times required for an arbitrary number of cycles M, an estimate of N, to pass through the ground station. Thus, $$f_x = M/T_x \text{ and } f_y = M/T_y \quad (30)$$

where $T_x = t_6 - t_5$ and $T_y = t_8 - t_7$.

The propagation periods of such frequencies are $\tau_x$ and $\tau_y$ where $\tau_x$ is the propagation period at time $$t_6 - \frac{\tau_x}{2}$$

and $\tau_y$ is the propagation at a time $$t_8 - \frac{\tau_y}{2}$$

Since both $f_x\tau_x$ and $f_y\tau_y$ are equal to N, $$f_x\tau_x - f_y\tau_y = 0 \quad (31)$$

or $$\frac{M}{T_x}\tau_x = \frac{M}{T_y}\tau_y \quad (32)$$

Equation 32 may be reduced to $$\tau_x = T_x \frac{\Delta\tau}{\Delta T} \quad (33)$$

where $$\Delta T = T_y - T_x \text{ and } \Delta\tau = \tau_y - \tau_x$$

The figure $\Delta\tau$ must be obtained from a Doppler reduction made upon a second independent carrier, or, in the case of a fixed vehicle, may be manually inserted into the closed loop between the measure of $f_x$ and $f_y$.

Multiplying each side of Equation 33 by $f_x$ the following relationship results.

$$f_x\tau_x = \frac{M}{T_x}\left[T_x\frac{\Delta\tau}{\Delta T}\right] = M\frac{\Delta\tau}{\Delta T} \approx N \quad (34)$$

Since N, the number of cycles in the closed loop is an integer, $$M\frac{\Delta\tau}{\Delta T}$$

can be solved with N being equal to the closest integer thereto, if the system design is such that the inaccuracy of (34) is less than $\pm\frac{1}{2}$ cycle.

Once N is determined, the range of the vehicle at any time may be computed. For example, the time required to count N cycles passing through the ground station is first determined. From such time, the phase delays in the ground station and the vehicle are first subtracted to yield a net propagation time $\tau$ which, when multiplied by $\frac{1}{2}C$, yields the range of the vehicle S. The time when the vehicle was at such a range or distance is equal to the time when the first transmitted cycle was reflected, namely when the count was stopped at N cycles minus $\frac{1}{2}\tau$, $\tau$ being the total time necessary to count the N cycles.

Since the number of cycles N is a constant and, once determined, does not change, the range of the vehicle at subsequent times during its travel may be simply and conveniently determined by again measuring the time required for N cycles to pass through the ground station, minus the phase delays. The net time is then multiplied by $\frac{1}{2}C$ to provide the new range of the vehicle.

Figure 4:
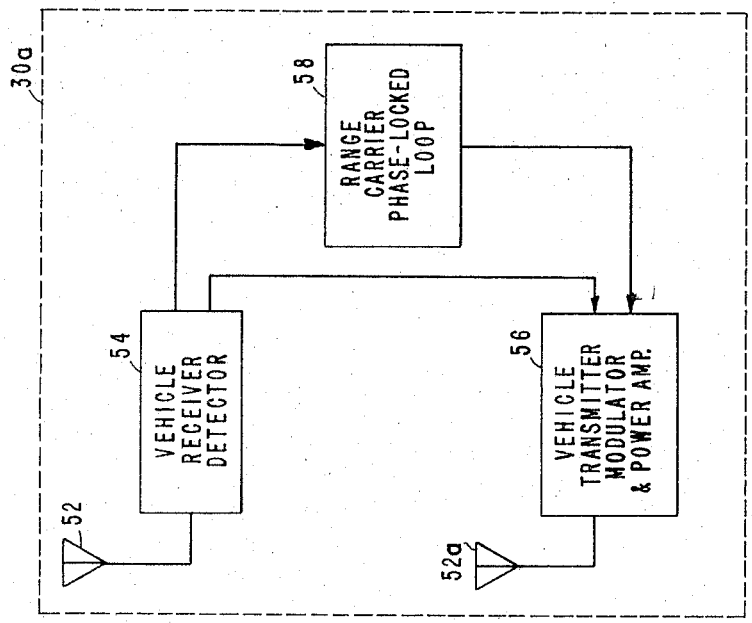
FIGURE 4 is a simplified block diagram of the ranging system of the present invention.
Figure 4:
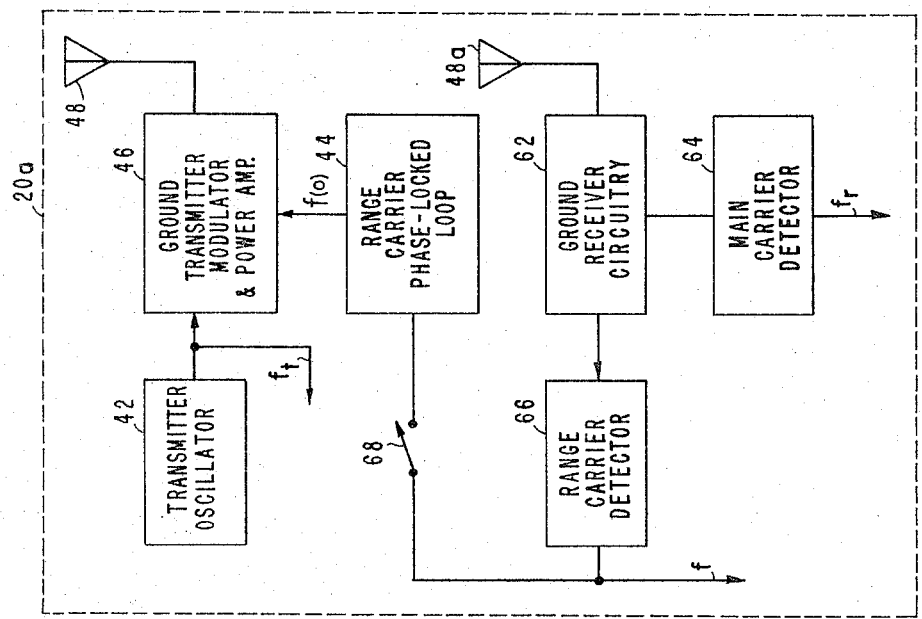

Reference is now made to FIGURE 4 which is a block diagram of the ranging system of the present invention. As seen therein, the system includes a communication system 20a installed in the ground station 20 and a communication station 30a, installed in the moving vehicle 30. As previously stated, according to the teachings disclosed, a dual-carrier communication system is employed in which one of the carriers, referred to as the range carrier, is in a closed loop arrangement, and the other carrier, referred to as the main carrier, is transmitted in open loop.

In the ground station 20a, the main carrier frequency $f_t$ is provided from a transmitter oscillator 42 which together with a range carrier frequency $f_0$ from an initially free running range carrier phase-locked loop 44, energizes a ground transmitter modulator and power amplifier 46. The output of circuit 46 is in turn supplied to a ground station transmitting antenna 48 so that both the main carrier signals and the range carrier signals are radiated to the moving vehicle 30, wherein they are received by a vehicle receiving antenna 52.

The carriers are detected in a vehicle receiver detector 54 which supplies the main carrier $f_t$ directly to a vehicle transmitter modulator and power amplifier 56. Coherent transponding may take place on the main carrier ($f_t$) at this point, if necessary. Also, the range carrier, detected in the detector 54, is used to control a range carrier phase-locked loop 58 which, as hereinbefore explained, produces an instantaneous output frequency which equals the instantaneous input frequency thereto. The output of the circuit 58 is also supplied to the vehicle transmitter modulator and power amplifier 56 which in turn supplies the two carriers to a vehicle transmitting antenna 52a.

Antenna 52a, for explanatory purposes only, is shown in FIGURE 4 as separate from the receiving antenna 52, however, it being apparent that a single antenna may be used in the vehicle or the ground station for concurrent transmitting and receiving operations. The carriers received by a receiving antenna 48a and therefrom by ground receiver circuitry 62 are detected by a main carrier detector 64 and a range carrier detector 66.

From the foregoing description and explanation, it is seen that the main carrier $f_t$ is operated in an open loop so that the output frequency of the main carrier detector is always $f_r$ where $$f_r = f_t\frac{V-C}{V+C} = f_t\frac{1-\frac{\dot{\tau}}{2}}{1+\frac{\dot{\tau}}{2}} \quad (35)$$

Namely, $f_r$ the received main carrier frequency, is equal to the transmitted main carrier frequency modified by the Doppler effect. If coherent transponding occurred in the vehicle, Equation 35 is suitably modified. Similarly, as long as the range carrier phase-locked loop 44 is free running so as to supply a constant range carrier frequency $f_0$, the output frequency of the range carrier detector is $f_0$ modified by the Doppler effect, or, $$f_1 = f_0\frac{C-V}{C+V} = f_0\frac{1-\frac{\dot{\tau}}{2}}{1+\frac{\dot{\tau}}{2}} \quad (35')$$

However, as soon as the range carrier phase-locked loop 44 is prevented from free running, by closing a normally open switch 68 so as to supply thereto the instantaneous output frequency of the detector 66, the frequency of the range carrier will continuously decrease as shown in the diagram of FIGURE 2 and hereinbefore explained. Irrespective however of such change in frequency, the number of cycles N locked in the range carrier closed loop arrangement is a constant integer, which can be computed from the transmitted and received main carrier frequencies designated $f_t$ and $f_r$ respectively, and from the changing frequency of the range carrier detected by the range carrier detector 66. Once the number N is determined, the time required for N cycles to pass through the ground station 20a is conveniently measured, and therefrom the range of the vehicle is derived.

Reference is now made to FIGURE 5 which is one arrangement for deriving the number of cycles N, and therefrom, the range of the vehicle 30 from the ground station 20. As seen from Equation 34, N equals the nearest integer of the product of M and $\Delta\tau$ divided by $\Delta T$, which are defined hereinbefore. Namely, M represents an estimate of N; $\Delta T$ is the time difference between two independent time periods during which M cycles of the main carrier pass through the ground station, and $\Delta\tau$ is the change in propagation occurring between such time periods.

As seen from FIGURE 5, an arrangement for deriving N as well as the range of the vehicle 30 from the ground comprises a preset cycle circuit 72 which sets each of preset cycle counters 74 and 76 to count M cycles. The counter 74 is also supplied with signals $f_1$ from the range carrier detector 66 so that when a start pulse is supplied to the counter 74, as well as to a time interval computer 78 from a timing circuit 82, the counter 74 counts M cycles supplied from the range carrier detector 66. When the M cycles are counted, a stop pulse is supplied from the counter 74 to the computer 78, which is also connected to a precision time reference 80. Thus, the time interval computer 78 computes the time period required for M cycles to be detected by the detector 66. Such time period represents $T_x$, expressed in Equation 30, where the start and stop pulses occur at times $t_6$ and $t_5$ respectively.

The counter 76 is similarly connected to the detector 66, the timing circuit 82 and a time interval computer 84, so that at another predetermined time, such as $t_7$, a start pulse is supplied to the counter 76 to count M cycles received from the detector 66. After counting the M cycles such as may occur at a time $t_8$, a stop pulse is supplied from the counter 76 to the computer 84 so that the computer may calculate the second time period $T_y$ (see Equation 30) which equals $t_8-t_7$.

The values representing the two time periods $T_x$ and $T_y$ are supplied to a time difference circuit 86 so that the difference $\Delta T$ between the two periods may be derived (see Equations 33 and 34).

The value $\Delta T$ as well as the value M are supplied from the time difference circuit 86 and the preset cycle circuit 72 to an N cycle computer 88. The computer 88 is also supplied with a signal representing $\Delta \tau$ (see Equations 33 and 34) from a Doppler measuring system 90. From the foregoing mathematical analysis and in particular, Equations 31 through 33, it is seen that $\Delta \tau$ is the change in the actual propagation time occurring between the two periods from which $\Delta T$ was derived. $\Delta \tau$ may be obtained by integrating the rate of change of propagation, $\dot{\tau}$, over the time between the two periods. In the foregoing example, $T_x$ is assumed to be equal to $t_6-t_5$ and $T_y$ is assumed to be $t_8-t_7$, therefore $\tau$ is integrated between time $t_6$ and $t_8$. Namely, $$\Delta \tau = \int_{t_6}^{t_8} \dot{\tau}(t) dt \qquad (36)$$

where $\dot{\tau}(t)$ is obtained from $f_r$ and $f_t$ by (see Equation 35):

$$\dot{\tau}(t) = 2 \frac{f_t(t) - f_r(t)}{f_t(t) + f_r(t)} \qquad (37)$$

Equation 37 is suitably modified if coherent transponding occurred.

The time instances $t_8$ and $t_6$ are the time instances when the stop pulses are supplied by counters 76 and 74 respectively. And $\Delta \tau$ may be derived from measurements made by conventional Doppler measuring techniques on the transmitted and received open loop main carrier frequencies $f_t$ and $f_r$, as in (37). Thus, by providing the Doppler measuring system 90 with frequencies $f_t$ and $f_r$ as well as the integrating boundary signals at $t_6$ and $t_8$, the increase in actual propagation $\Delta \tau$ may be derived and supplied to the computer 88.

With signals representing M, $\Delta T$ and $\Delta \tau$, the computer 88 multiplies M by $\Delta T$ and divides by $\Delta \tau$ to provide a computed estimate of N. However, since N is at all times an integer, the computed number is adjusted to the nearest integer to provide the desired value of N which represents the exact number of cycles circulating in the closed loop range carrier. Successive iteration to reduce the ambiguities to less than ±½ cycle may be used if system error exceeds ±½ cycle on a single measure.

The output of the computer 88, namely the value of N, is supplied to a preset counter 92 which is connected to a range and time computer 94 in a manner similar to the interconnections between counters 74 and 76 and computers 78 and 84 respectively. The counter 92 and computer 94 are connected to a manual switching control 96, which when actuated, energizes the counter 92 to start counting N number of cycles of the main carrier supplied thereto from the detector 66, and supply a stop count pulse to the computer 94 at the completion of counting the N cycles. The manual switching control 96 is also connected to the computer 94 to indicate the starting time of counting the N cycles so that the precise time required to count the N cycles may be determined. Such precise time is then the actual time required for the first cycle to propagate to the vehicle and back to the ground station as N cycles passed through the ground station.

The computer, after determining the round trip propagation time $\tau$, multiplies such value by the propagation velocity C and divides the product by two. The final result then equals the range of the vehicle S (see Equation 29). Alternately, the range may be expressed in time-units, $\tau$. The time when the vehicle was at such a range is easily computed by the computer 94 by recording the instant of time when the Nth cycle was counted and subtracting therefrom the time necessary for the first cycle to have propagated back to the ground station, namely subtracting a time equal to $\tau/2$. The range S or $\tau$, as well as the time $t(S)$ or $t(\tau)$ when the vehicle was at such a range may be provided by the computer to an output unit 97 which produces a permanent record thereof.

During the flight of the vehicle, the subsequent ranges may be conveniently determined by again actuating the manual switching control 96 so as to actuate the counter 92 and computer 94 to determine the time required for N cycles to pass through the ground station. From such time determination, the range at a subsequent time can be conveniently derived.

Although in the foregoing description, the invention has been described in conjunction with radio signals, the basic equation of $N = f\tau$ is not limited to such signals. In one reduction to practice, a closed loop communication system was used in which sound waves were employed to determine the distance between a transmitting sound source such as a speaker and a microphone which acted as a sound receiver, electronically returning the received sound to the speaker for retransmission.

The equation $N = f\tau$ may be written in terms of distance and wavelength.

Since $f$ equals $C_S/\lambda$ where $\lambda$ is wavelength, $\tau$ equals $C_S/\gamma$ or $$C_S \tau = N\lambda \qquad (38)$$

Where $C_S$ is the propagation velocity of sound. But in a unidirectional system, namely where the sound waves travel in one direction only between transmitter and receiver with the return travel being electronically provided, the distance S between the transmitter and receiver equals $C_S \tau$. Thus, $$S = N\lambda \qquad (39)$$

The expression of Equation 39 is linear, and since both $C_S$ and N are constants, it is seen that once N is known, the distance S may be determined by measuring the wavelength of the signals in the closed loop system.

From the foregoing description, it is seen that if a closed loop signal communication system is created between two stations wherein the instantaneous transmitted signal at each station is controlled by the instantaneous received signal, a fixed number of signals or cycles circulate through the closed loop. Once the number of cycles is determined, the distance between the two stations may be determined as a function of the time required for the fixed number of cycles to propagate around the closed loop. If one of the stations is moving with respect to the other, in addition to the closed loop signal communication system, an open loop communication arrangement need be incorporated in order to provide Doppler measurements which are necessary for the derivation of the constant number of cycles in the closed loop arrangement.

From the foregoing description, it is seen further by one familiar with the art, that when the arrangements shown in FIGURES 4 and 5 are actually reduced to practice, they may further include conventional circuitry (not shown) used to suppress spurious noise signals, as well as circuitry to isolate the various transmitting and receiving systems, so that the two carriers, one in an open loop and the other in a closed loop, are properly transmitted and received in both the ground station and the moving vehicle.

Also, some of the circuits separately shown in FIGURE 4 may be combined in a single unit since they perform the same functions at different times. For example, counters 74, 76 and 92 may be the same counter, whereas computers 88 and 94 may be combined since the computations performed therein occur at different times.

It is further apparent to those familiar with the art that modifications may be made in the arrangements as shown without departing from the true spirit of the invention. Therefore, all such modifications and equivalents are deemed to fall within the scope of the invention as claimed in the appended claims.

What is claimed is:

1. A system for determining the range between a fixed station and a moving station comprising a first radio signal transmitting-receiving system in said fixed station including first and second communication channels; a second radio signal transmitting-receiving system in said moving station including first and second communication channels; means for controlling the transmission and reception of radio signals in said first channels of said first and second transmitting-receiving systems to derive Doppler measurements therefrom; means for controlling the transmission and reception of radio signals in said second channels of said first and second transmitting-receiving systems including means for controlling the instantaneous frequency of transmitted radio signals in each of said second channels to be substantially equal to the instantaneous frequency of the radio signals received thereby so as to fix the total phase between said second channels to an integer number of cycles; means including means responsive to said Doppler measurements for determining said fixed number of cycles propagating between the second channels of said first and second transmitting-receiving systems; and means for measuring the time period required for said fixed number of radio signals to propagate between said first and second transmitting-receiving systems and for computing as a function of said measured time period the range between said fixed station and said moving station.

2. In a ranging system wherein radio signals are analyzed to determine the distance between first and second stations, one of the stations moving with respect to the other, each station including a communication system for transmitting and receiving radio signals, the arrangement comprising closed loop means included in the communication system of each of said first and second stations for controlling said systems to transmit radio signals having characteristics substantially identical to radio signals received thereby so as to maintain the number of cycles of the signals propagating between said stations at a constant value; first computing means for deriving the constant number of cycles of the signals propagating between said first and second stations; and means including second computing means for determining the time period required for said constant number of cycles to propagate between said first and second stations and for computing the distance between said stations as a function of the propagation time period of said constant number of cycles therebetween.

3. In a ranging system wherein signals are analyzed to determine the range between first and second stations, each station including a communication system for transmitting and receiving signals, with said second station moving with respect to said first station the arrangement comprising first and second closed-loop means for controlling the communication systems of each of said first and second stations to transmit signals as a function of the signals received therein so as to control at a constant value the number of cycles of signals transmitted between said first and second stations; and means for computing the distance between said first and second stations as a function of the constant number of cycles of the signals transmitted therebetween.

4. In a ranging system as recited in claim 3 wherein each station includes a communication system for transmitting and receiving radio signals the range being determined between a first fixed station and a second moving station, and wherein the communication system in each station further includes opened-loop means for determining the velocity of said moving station.

5. A ranging system comprising first and second transmitting-receiving systems, moving with respect to one another, each system having first and second transmitting-receiving channels; first means for controlling said first channel of each transmitting-receiving system to operate in an open loop whereby the frequency of radio signals transmitted from said first system is substantially constant and whereby the frequency of the radio signals received thereby is modified by the Doppler effect; second means for controlling said second channels of said first and second transmitting-receiving systems to operate in a closed loop whereby the instantaneous frequency of the radio signals transmitted by the second channel of each transmitting-receiving system is controlled by the instantaneous frequency of the radio signals received thereby so as to fix the number of cycles of the radio signals propagating between said second channels of said transmitting-receiving systems; third means including first computing means for determining said number of cycles fixed between said second channels of said transmitting-receiving systems; and fourth means for deriving as a function of said fixed number of cycles the range between said first and second transmitting-receiving systems.

6. A ranging system as recited in claim 5 wherein said third means further include means responsive to said signals modified by the Doppler effect for determining the velocity of the moving system with respect to the other, and wherein said fourth means include time precision means for determining the propagation time of said fixed number of cycles to be communicated between said first and second transmitting-receiving systems.

7. In a ranging radio communication system wherein a first transmitting-receiving arrangement in a first station is in radio signal communication with a second transmitting-receiving arrangement in a second station, with radio signals transmitted by one arrangement being received by the other arrangement so as to derive the range between said first and second stations the improvement comprising radio communication interlocking means for interlocking said first and second transmitting-receiving arrangements to maintain at a constant value the number of cycles of the radio signals transmitted and received between said first and second arrangements; and means for measuring said number of cycles of the radio signals and for determining the time period required for said constant number of cycles of the radio signals to be received by said first transmitting-receiving arrangement so as to derive the range between said first and second stations.

8. In a ranging radio communication system as recited in claim 7 wherein said second station is moving with respect to said first station, said improvement further including means for deriving the Doppler effect produced by the velocity of said second station with respect to said first station, and wherein said means for measuring responsive to the Doppler effect further including time precision means for determining said time period required for said constant number of radio signals to be received by said first station.

9. In a radio communication system between a fixed station and a moving station wherein radio signals transmitted and received between said stations are analyzed to measure the Doppler effect related to the velocity of said moving station an arrangement for determining the range between the stationary station and the moving station comprising first and second closed-loop radio signal transmitting and receiving means included in said fixed station and said moving station respectively for controlling the instantaneous frequency of the radio signals transmitted at each station to equal the instantaneous frequency of the radio signals received thereby, so as to maintain at a constant value the number of cycles of transmitted and received radio signals, means for deriving the constant number of cycles of the transmitted and received radio signals; means for determining the time period required for a number of cycles of radio signals equal to said constant number of cycles of radio signals to be transmitted and received by the first closed-loop radio signal transmitting-receiving means; and means for deriving as a function of said time period the range between said stationary station and said moving station.

10. In a radio communication system as recited in claim 9 wherein said means for deriving said constant number of cycles include means for determining the difference in time $\Delta T$ for M cycles to be recovered by said first closed-loop at two distinct time periods, where M is an estimate of said constant number of cycles equalling N, and means for deriving $\Delta \tau$ equalling the change in propagation time of said radio signals between said two distinct time periods, and means for computing N where $$N \approx M \frac{\Delta \tau}{\Delta T}$$

N being the closest integer to the product of M and $\Delta \tau$ divided by $\Delta T$.

11. The method of determining the range between two stations, each including a signal communication system, the steps comprising communicating with radio signals between the stations in a closed-loop arrangement whereby the number of cycles of the radio signals in the closed-loop is fixed, determining the fixed number of cycles of the radio signals used to communicate between the stations in the closed-loop arrangement; measuring the propagation time of the fixed number of cycles; and computing on the basis of the measured propagation time the range between the two stations.

12. The method of determining the range between two stations, each including a signal communication system, the steps comprising communicating with radio signals between the stations in an open-loop arrangement wherein the frequency of signals transmitted by one station is a constant and the frequency of the signals received by said one station from the other station in response to said signals is modified by the Doppler effect as a function of the velocity of one station with respect to another; communicating with radio signals between the stations in a closed-loop arrangement so as to fix the number of cycles of the radio signals in said closed-loop arrangement to an integer number of cycles; deriving the integer number of cycles of the radio signals in said closed-loop arrangement as a function of the frequencies of the transmitted and received frequencies of the radio signals in said open-loop arrangement and as a function of at least two measurements on cycles in said closed-loop arrangement equal in number to an estimate of said integer number; measuring the propagation time of a number of cycles of radio signals in said closed-loop arrangement equal in number to said integer number; and computing on the basis of the measured propagation time the range between the two stations at a time equal to the instant when the propagation time was measured less half such propagation time period.

13. The method of determining the range between a fixed station and a moving station on the basis of radio signals propagating between the two stations in closed and open loop communication arrangements the steps comprising propagating radio signals between said fixed and moving stations in said open-loop arrangement so as to derive the Doppler effect as a function of the velocity of said moving station; propagating radio signals between said fixed and moving stations in said closed-loop arrangement so as to fix the number of cycles of radio signals propagating in said closed loop at an integer number; determining said integer number of cycles in said closed loop in accordance with the relationship $$N \approx M \frac{\Delta \tau}{\Delta T}$$

where N is said integer number of cycles equalling the nearest integer of M times $\Delta \tau$ divided by $\Delta T$, where M is an approximation of N, $\Delta T$ is the difference in the time required for M cycles to be received at the closed-loop arrangement of the fixed station at two distinct time periods, and $\Delta \tau$ is the change in propagation rates at said two distinct time periods derived as a function of said Doppler effect; and deriving the range between said fixed station and said moving station as a function of said integer number of cycles where $$S = \frac{C\tau}{2}$$

S being the range, C is the velocity of radio signals, and $\tau$ is the time for N cycles to be received at the closed-loop arrangement of the fixed station.

References Cited by the Examiner

UNITED STATES PATENTS

| | | | |
|---|---|---|---|
| 3,130,403 | 4/1964 | Granqvist | 343—12 |
| 3,130,404 | 4/1964 | Fried | 343—14 |
| 3,230,453 | 1/1966 | Boor et al. | 325—67 |

CHESTER L. JUSTUS, *Primary Examiner.*

J. P. MORRIS, *Assistant Examiner.*